United States Patent
Schwartzkopf et al.

(10) Patent No.: US 12,540,475 B2
(45) Date of Patent: Feb. 3, 2026

(54) BOARD PUSHER TOOL AND RELATED METHOD OF USE

(71) Applicant: National Nail Corp., Grand Rapids, MI (US)

(72) Inventors: Todd E.A. Schwartzkopf, Hudsonville, MI (US); Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 757 days.

(21) Appl. No.: 17/824,203

(22) Filed: May 25, 2022

(65) Prior Publication Data

US 2023/0383553 A1 Nov. 30, 2023

(51) Int. Cl.
| | |
|---|---|
| *E04F 21/22* | (2006.01) |
| *B25B 5/00* | (2006.01) |
| *B66F 19/00* | (2006.01) |
| *E04B 5/12* | (2006.01) |
| *E04F 15/02* | (2006.01) |
| *E04B 1/00* | (2006.01) |

(52) U.S. Cl.
CPC .............. *E04F 21/22* (2013.01); *B66F 19/00* (2013.01); *E04B 5/12* (2013.01); *E04F 15/02044* (2013.01); *E04B 1/003* (2013.01); *E04F 2015/02094* (2013.01); *E04F 15/02183* (2013.01)

(58) Field of Classification Search
CPC ...... E04F 15/02044; E04F 2015/02094; E04F 21/22; E04F 15/02022; E04F 15/02183; F16B 5/002; F16B 5/0088; B25B 23/005; B25B 23/08; B25B 5/06; B25B 25/005; B25B 5/12; B23Q 3/183; H05K 13/022; B21D 43/003; B66F 19/00; E04B 5/12; E04B 1/003
USPC .............................. 269/254 CS, 224; 254/11
See application file for complete search history.

(56) References Cited

U.S. PATENT DOCUMENTS

| | | | | |
|---|---|---|---|---|
| 1,828,791 | A | * | 10/1931 | Thompson ........... B23Q 3/1543 269/95 |
| 2,779,275 | A | * | 1/1957 | Spainhour ............... B44B 5/022 279/136 |
| 3,799,533 | A | * | 3/1974 | Malott ...................... B25B 1/14 269/201 |

(Continued)

FOREIGN PATENT DOCUMENTS

WO 2014171271 10/2014

*Primary Examiner* — Mahdi H Nejad
(74) *Attorney, Agent, or Firm* — Warner Norcross + Judd LLP (57) ABSTRACT

A board pusher tool is provided to hold one or more boards in a readied position and orientation relative to one another and an underlying joist. The pusher can include a base, a magnet joined with the base to secure the base in a fixed position relative to an underlying joist constructed from a magnetic material, a bumper reciprocally joined with the base, a guide joined with the bumper to allow the bumper to extend a predetermined distance away from the base, and a biasing element pushing the bumper away from the base, where the bumper forcibly urges the board away from the base, optionally toward or against another board, while the magnet secures the base in the fixed position relative to the underlying joist. A related method of use is provided.

14 Claims, 7 Drawing Sheets

(56) References Cited

U.S. PATENT DOCUMENTS

| | | | | |
|---|---|---|---|---|
| 4,620,691 | A * | 11/1986 | Waters, Jr. | E04F 21/22 |
| | | | | 254/16 |
| 4,677,744 | A * | 7/1987 | Muller | H02K 15/03 |
| | | | | 29/729 |
| 4,821,393 | A * | 4/1989 | Spigarelli | B25B 5/06 |
| | | | | 29/283 |
| 5,190,266 | A * | 3/1993 | Barrera | E04F 21/22 |
| | | | | 269/904 |
| 5,527,014 | A * | 6/1996 | Bracewell | E04F 21/22 |
| | | | | 254/15 |
| 6,905,116 | B2 * | 6/2005 | Cummines | B25B 5/12 |
| | | | | 269/224 |
| 6,971,635 | B1 * | 12/2005 | Foster | E04F 21/22 |
| | | | | 254/17 |
| 10,895,080 | B1 * | 1/2021 | MacKenzie | E04F 15/02044 |
| 11,007,624 | B2 * | 5/2021 | Wong | B25B 11/002 |
| 11,261,893 | B2 * | 3/2022 | Vandenberg | F16B 12/2063 |
| 11,938,596 | B1 * | 3/2024 | Vandenberg | B25B 23/005 |
| 12,234,654 | B2 * | 2/2025 | Vandenberg | F16B 5/02 |
| 12,297,649 | B2 * | 5/2025 | Timothy | E04F 15/02183 |
| 2004/0144056 | A1 * | 7/2004 | Morton | B29C 48/17 |
| | | | | 52/582.1 |
| 2010/0180986 | A1 * | 7/2010 | Pelc, Jr. | E04F 21/22 |
| | | | | 254/131 |
| 2015/0076757 | A1 * | 3/2015 | Shula | B25B 5/006 |
| | | | | 269/95 |
| 2019/0275648 | A1 * | 9/2019 | Vandenberg | B25B 23/005 |
| 2020/0087925 | A1 * | 3/2020 | Vandenberg | E04F 15/183 |
| 2021/0277668 | A1 * | 9/2021 | Vandenberg | E04F 15/02044 |

\* cited by examiner

BOARD PUSHER TOOL AND RELATED METHOD OF USE

BACKGROUND OF THE INVENTION

The present invention relates to an installation tool and, more particularly, to a tool adapted to push or move parallel boards together in decks, flooring and other structures.

There are many conventional tools utilized for pushing deck or flooring boards into parallel contact before securing the boards to a joist. One such tool is illustrated in U.S. Pat. No. 9,932,744 to Vandenberg, which is assigned to National Nail Corporation, and incorporated by reference in its entirety herein. Although the tool in this patent works exceptionally well, it can sometimes have drawbacks.

For example, while the National Nail tool can efficiently push boards against one another, it has to be manually set up and actuated via a lever to push the boards. The user also has to carefully determine and set the amount of force applied to the boards, which can vary depending on the type, layout and/or quality of the boards. Due to its manual actuation, the tool has to be manually released from a locked position to remove the tool from an underlying joist after each use, which can add steps and time to a typical deck building job. The tool further is set up to grip part of the underlying joist, and can sometimes dig into that joist. If the joist is metal and painted, the gripping can scratch or mar the paint. Due to its size, the tool also can consume a lot of space around the joist and board, which can limit where a user can work.

Accordingly, there remains room for improvement with regard to tools used to hold or otherwise place boards in a satisfactory position so that they can be secured to underlying joists or substructures.

SUMMARY OF THE INVENTION

A board pusher tool is provided to hold one or more boards in a readied position and orientation relative to one another and an underlying joist for installation.

In one embodiment, the pusher can include a base and a magnet joined with the base to secure the base in a fixed position relative to an underlying joist constructed from a magnetic material. The magnet can be disposed on a lower surface of the base, and can include a coating, cover, layer or film to present an interface between the base or magnet and the joist, so that the magnet and base will not scratch, mar or damage a surface of the underlying joist.

In another embodiment, the pusher can include a bumper reciprocally or moveably joined with the base, configured to move toward and/or away from the base depending on the forces exerted by the bumper on a board or vice versa. The bumper can be configured to engage the board to forcibly urge the board away from the base, and optionally toward another adjacent board, while the magnet secures the base in the fixed position relative to the underlying joist.

In still another embodiment, the pusher can include a biasing element. The biasing element can be disposed between the bumper and the base. When the bumper is forcibly engaged against a board, the biasing element can be modified or compressed to store energy. The base and magnet can be secured to the underlying joist via a magnetic force while the bumper is retracted toward the base and the biasing element is compressed or otherwise stores energy. The biasing element can exert a reactive force against the bumper and the board with which it is engaged, to hold, urge or move that board toward another board, away from the base, or generally along or relative to the underlying joist.

In yet another embodiment, the pusher can include a guide joined with the bumper. The guide can allow the bumper to extend a predetermined distance away from the base, and in particular a work piece facing surface thereof. The guide can guide the bumper relative to the base when the bumper is forcibly engaged against the board positioned on the underlying joist before the board is fastened to the underlying joist.

In even another embodiment, the bumper, biasing element and guide can cooperate to manage movement of the bumper. For example, the biasing element can push the bumper away from the base and its work piece facing surface while the guide restrains the bumper from extending beyond the predetermined distance.

In a further embodiment, a method of using the pusher to install a structure, such as a deck, platform or surface is provided. The method can include placing a first board on an magnetic material underlying joist; placing a second board on the underlying joist, adjacent the first board in a parallel or other configuration with the first board; positioning the pusher adjacent the first board so that the bumper forcibly pushes the first board toward the second board; and securing the pusher adjacent the first board via a magnet associated with the pusher, the magnet exerting a magnetic force on the joist so that the pusher is disposed in a fixed position relative to the underlying joist while the bumper forcibly pushes the first board toward the second board.

In still a further embodiment, the method can include positioning a third board adjacent the second board and on the underlying joist, and optionally positioning a fourth board adjacent the third board and on the underlying joist. The pusher can push the first board toward the second board, and simultaneously push the second board toward the third board, all while the first board, second board and third board are free floating and unsecured relative to the underlying joist, before any of those boards are fastened down to the joist.

In yet a further embodiment, the method can include securing the first board and the second board fixedly to the underlying joist while the pusher pushes the first board toward the second board. The third board also can be secured to the underlying joist where included in the system.

In even a further embodiment, the method can include sliding the first board, the second board and the third board together simultaneously along the underlying joist with the pusher. When the boards are satisfactory positioned, aligned or oriented relative to one another and/or the underlying joist, the first board, second board and third board can be fastened to the underlying joist with respective clips and/or fasteners while the pusher pushes the first board toward the second board toward the third board.

In a further embodiment, the method can include positioning the pusher, including the bumper projecting away from the base and biased therefrom via a biasing element, adjacent the first board so that the bumper forcibly engages the first board with a force of at least 2 pounds, at least 3 pounds, at least 4 pounds, at least 5 pounds, at least 10 pounds, at least 15 pounds, or at least 20 pounds depending on the application, to push the first board toward the second board, and/or generally away from the base.

In still a further embodiment, the method can include compressing the biasing element while sliding the magnet or base along the underlying joist toward the first board. When the board is satisfactorily positioned, the pusher can be magnetically secured in a fixed position relative to the joist based on wherever the pusher was slid to relative to the joist.

In yet a further embodiment, one or more pushers can be set in parallel along joists to engage a board along its length in several locations to adequately push the board adjacent another board or portions of clips between the boards. The pushers can temporarily set the boards in position, allowing a user to adjust the position of the boards where suitable. When all the boards and any optional clips are in place, and while the one or more pushers are adequately pushing on the boards, the user can install fasteners relative to the clips and/or the boards to secure those boards to the underlying joist.

The board pusher and methods of the current embodiments herein can provide a quick and efficient toll to install boards relative to one or more joists to build a deck, platform, floor or other structure upon one or more structural elements, such as an underlying joist that comprises magnetic material. The pusher can effectively apply a force against one or more boards to align them with one another and/or another structure over the underlying joist. Where it includes a magnet to fix the pusher to the joist, the pusher can provide hands free operation to hold the boards in place after placement, so the user can then easily and quickly fasten down the boards to the joist, without the aid of another user holding the boards in place.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A board pusher tool of a current embodiment is shown in FIGS. 1-7 and generally designated 10. The board pusher can be used in multiple construction, installation, remodeling and/or repair projects. The current embodiment of the board pusher 10 is shown in use to install multiple boards 101, 102, 103, etc. relative to one or more underlying joists 106. The boards as used herein can be any type of elongated construction element, such as a board, a strip, a panel, a sheet, trim, flooring, tongue and groove boards, interfitting boards, or any other similar construction elements. Further, the board used herein can be constructed from wood, polymers, composites, combinations of the foregoing, or other materials, depending on the application. The underlying joist as used herein can be another type of elongated construction element, in the form of a beam, board, wall, or other substructure that is configured to be located under or near the boards that are positioned atop of near the underlying joist, which can also include a joist, wall or other substrate that is simply near, rather than underlying, the boards. As used herein, with the pusher of the current embodiments, the underlying joist can be constructed to include magnetic material, such as iron, to which a magnet is typically attracted. This is so that when the pusher 10 is outfitted with a magnet as described below, that magnet can be magnetically attracted to the underlying joist via the magnetic force to enable the pusher to be disposed in a fixed position relative to the underlying joist during an installation or other procedure using the pusher 10.

Figure 1:
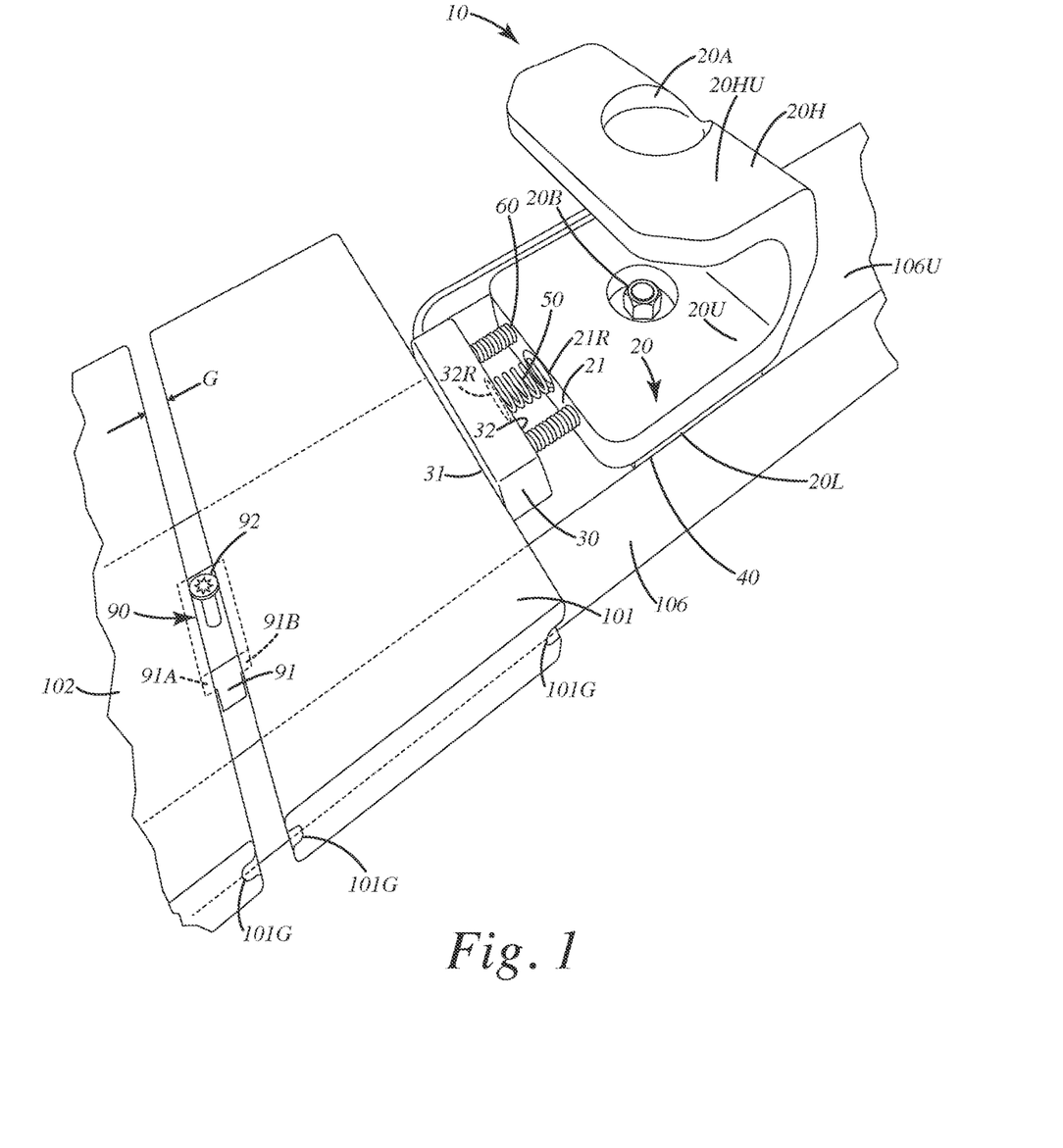
FIG. 1 is a perspective view of a board pusher of the current embodiment pushing against a first board that pushes against a clip that pushes against a second adjacent board.

Generally, in the construction techniques and methods herein, the boards can be placed parallel to one another over a joist 10. As shown in FIG. 1, the boards 101, 102, etc. can be generally transverse to the underlying joist 106. These boards can be secured or otherwise fastened to the underlying joist 106 in a fixed configuration after use of the pusher via one or more fastener units 90. As shown, the fastener unit 90 can be in the form of a clip having a spacer block 91 and a fastener 92 preinstalled in the clip. The clip also can include one or more arms or wings 91A and 91B that extend outward from the spacer block 91 along front and rear surfaces. A suitable fastener unit or clip for use herein is disclosed in U.S. Patent Application Publication 2021/0404190 to Vandenberg, and assigned to National Nail Corporation, which is incorporated by reference in its entirety herein. The clip 90 and fastener 92 used in connection with the pusher 10 can cooperate with and be can installed within corresponding grooves 101G on opposing side surfaces of the first board 101, second board 102, etc. In particular, the wings or arms 91A and 91B can be registered, inserted or disposed in the respective grooves 101G and 102G of adjacent, parallel boards 101 and 102. The fastener 92 can be installed as described below to engage the fastener unit and push the arms and spacer block downward toward the joist 106. The fastener 92 can penetrate and engage the joist 106 to secure the clip in place and thereby hold down the respective boards via engagement of the arms with the respective grooves of the respective boards. Of course, in this construction, the clip 90, and in particular the spacer block 91 can establish a gap G between adjacent boards, such as the boards 101 and 102 shown in FIG. 1.

Optionally, as described below, multiple boards can be installed over the underlying joist 106 relative to one another, in a parallel configuration, with the clips further installed between respective boards to establish gaps between them. One, two, three, four, five, ten, fifteen, twenty or more boards and their respective clips can be installed on multiple joists without fastening or securing those clips down to those joists. In such a case, the respective boards can remain free floating relative to the joists. In this application, the pusher 10, or multiple, similar pushers positioned over multiple underlying joists and engaging the first board 101 can be used to push and hold temporarily all of those free floating boards adjacent one another. Thus, a user can install or place multiple boards on the joist, and simultaneously place multiple clips with fasteners relative to those boards without fastening down the boards to the joist. Then, in a separate part of the installation, while the one or more pushers holds the boards in place, the user can install the multiple clips and/or fasteners to secure those boards permanently relative to the underlying joist as described below.

Generally, the pusher can be used with clips or fasteners such as those described above. In alternative applications, however, the pusher 10 can be used to fasten down boards relative to a joist using face screws, which can simply be bugle screws or deck face screws that penetrate an upper surface of the respective boards and advance into the underlying joist to secure those boards to that joist. In this application, the pusher can be used to secure, move and/or hold multiple boards adjacent and against one another while a user installs deck face screws relative to the boards and the underlying joist.

Figure 2:
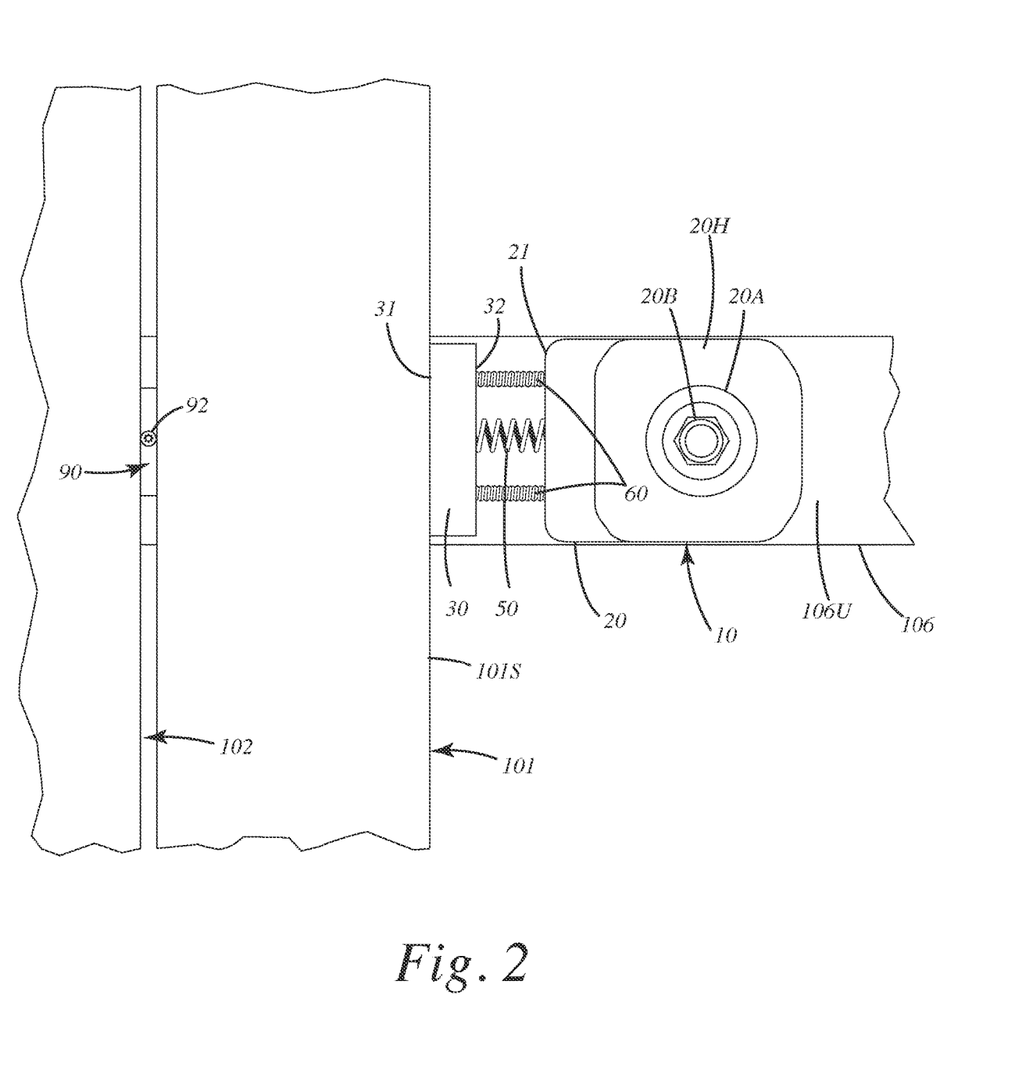
FIG. 2 is a top view of the board pusher pushing boards against each other.
Figure 3:
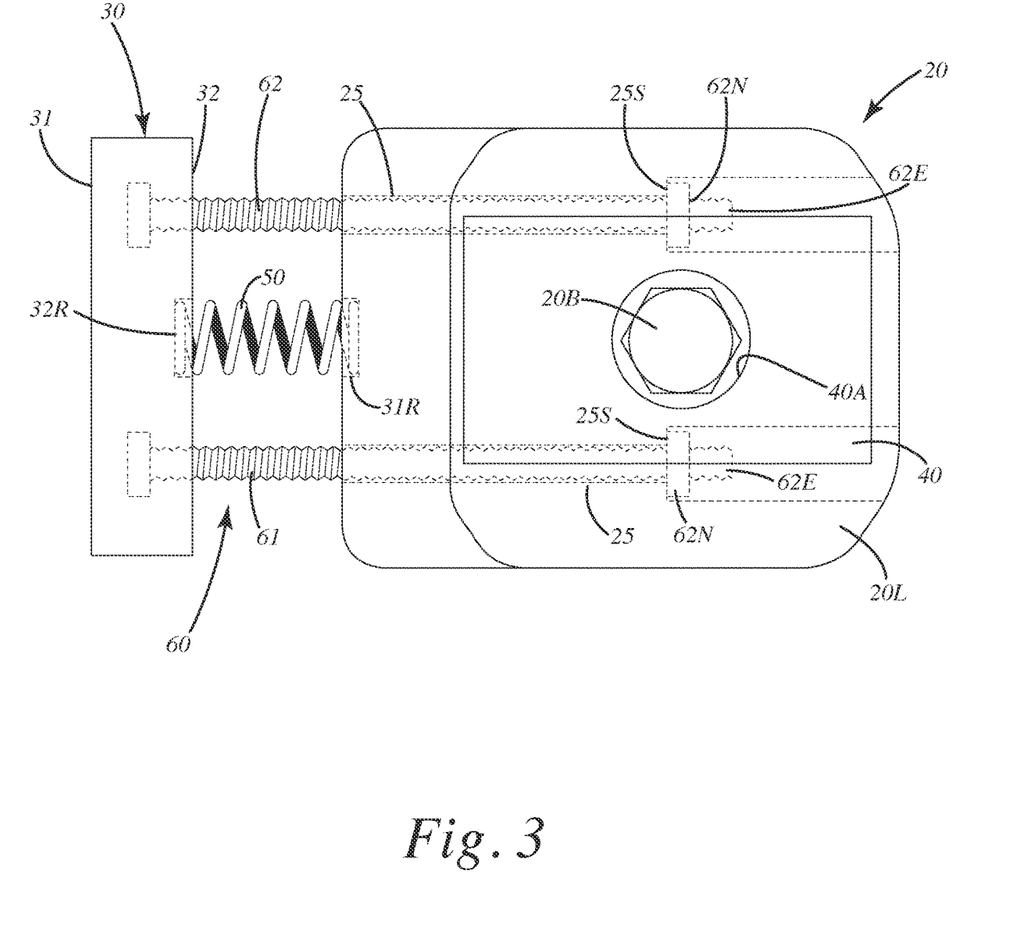
FIG. 3 is a bottom view of the board pusher, with a partial section view showing the biasing element and guide bars.

Turning now to FIGS. 1-3, the components of the pusher 10 will now be described in further detail. As shown in FIG. 1, the pusher 10 can include a base 20, a bumper 30 reciprocally or movably mounted to the base 20, and a magnet 40. The biasing element 50 can be disposed between the bumper 30 and the base 20, with an optional guide 60 guiding the bumper 30 for at least a portion of its movement. The base 20 can include a work piece facing surface 21, an upper surface 20U, and a lower surface 20L. The lower surface 20L can be situated to face toward the underlying joist 106. A handle 20H can extend upwardly from the base for example, from the upper surface 20U and can include an upper or curved portion 20HU that extends forwardly, generally in the direction of the bumper 30. The handle can be disposed distal from the work piece facing surface 21. The handle can be configured to be manually grasped by a user to place the base and magnet adjacent the underlying joist and otherwise manipulate the pusher in different orientations and positions relative to the joist and/or a board. Optionally, the handle can define an aperture 20A to allow manipulation or installation of a fastener 20B with a tool extending through that aperture 20A as described below.

Figure 4:
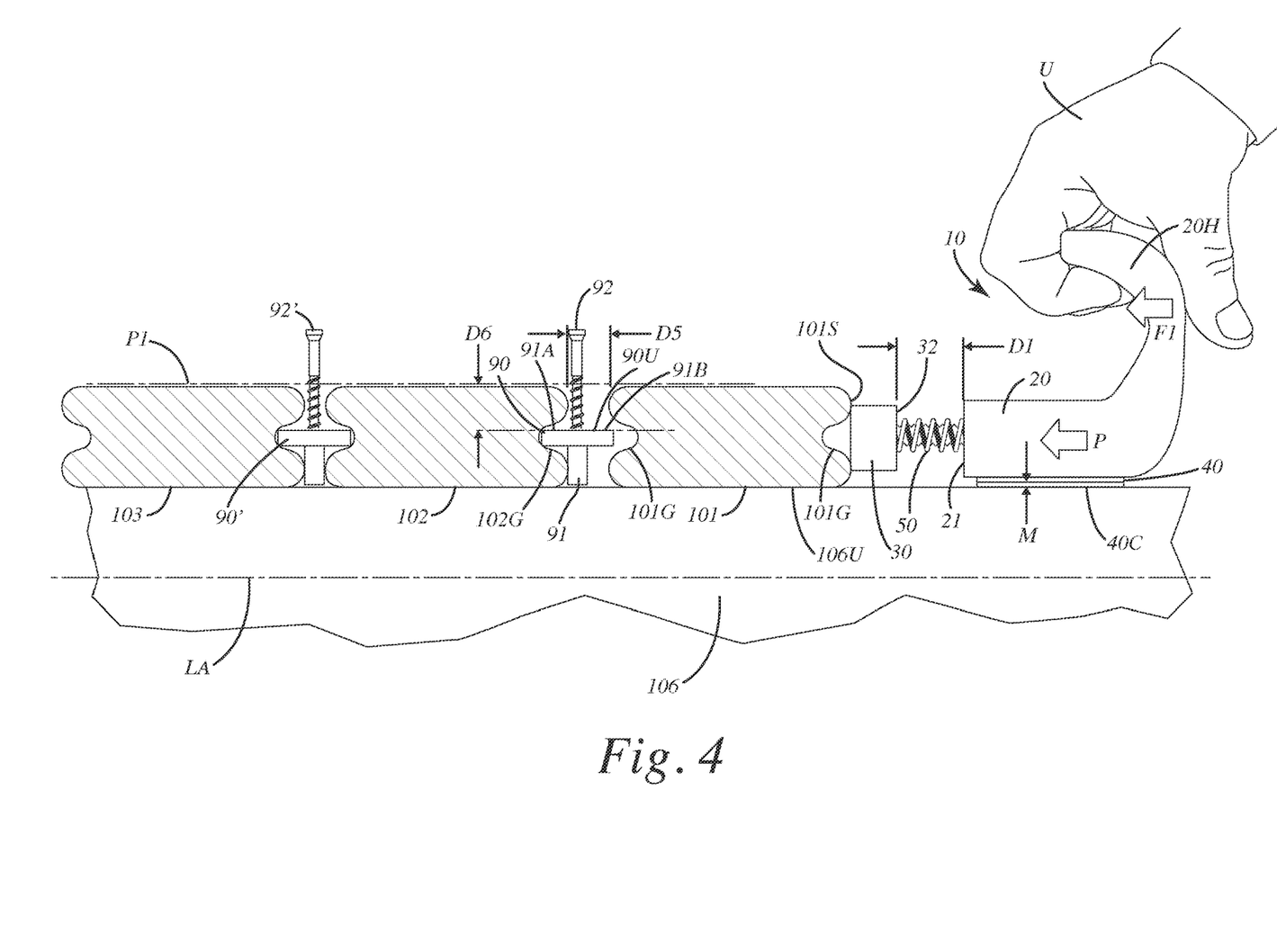
FIG. 4 is a side view of the board pusher initially placed on an underlying joist so that a bumper of the pusher engages and pushes a first board toward a second board and/or a fastener clip.

With reference to FIGS. 3-4, the base 20 can be configured to be joined with the magnet 40. The magnet 40 can be disposed adjacent the lower surface 20L and joined with the base. Optionally, the magnet can define an aperture 40A and a portion of the fastener 20B can secure the magnet 40 to the lower surface 20L of the base 20. Of course, where the fastener 20B is absent from the construction, the magnet optionally can be secured to the base, for example, the lower surface 20L via cement, glue, adhesives bonding, or other attachment structures. In some cases, the base and magnet can include corresponding shapes that interlock with one another. Further, in some cases, the magnet can be disposed adjacent the lower surface and joined with the base by being molded over by a polymeric material of the base such that the magnet is embedded inside the base.

The magnet 40 can be constructed to exert a magnetic force on another magnetic material. Suitable magnets for use in conjunction with the pusher can include neodymium magnets, samarium cobalt magnets, Alnico magnets, ceramic or ferrite magnets, as well as temporary magnets or other similar magnetic materials embedded within or otherwise joined with the base. In some applications, the magnet can be of a rather hard, metal like substance. In these cases, a cover 40C can be disposed over the lower surface of the magnet. This cover 40C can be a film, coating, paint or other material that can optionally prevent or impair the metal and/or base from directly contacting the underlying joist. Thus, where the underlying joist is painted, coated or includes another material, the magnet and base do not directly contact that material, such that the surface of the underlying joist is not scratched or marred by the pusher. In some cases, this can prevent premature damage, corrosion and/or degradation of the pusher 20.

With further reference to FIGS. 1-3, the pusher 10 as mentioned above can include a bumper 30. The bumper can be reciprocally joined to the base and can extend outward relative to the work piece facing surface 21. By reciprocally joined with the base, is meant that the bumper 30 can move toward and/or away from, and/or relative to, the base and/or the work piece facing surface 21. The bumper 30 can include an exterior surface 31 and an opposing interior surface 32. The interior surface 32 can face toward the work piece facing surface 21 of the base 20. Optionally the exterior surface 31 can include a cover (not shown) which can be in the form of a rubber, elastomeric and or other material so that the bumper does not damage the surface of the board when forcibly pushing against the side surface of the board during an installation procedure.

A biasing element 50 can be placed between the bumper and base as mentioned above. The biasing element 50 can engage the base and/or the bumper simultaneously. The biasing element can push the bumper away from the work piece facing surface 21. Optionally the biasing element 50 can be disposed directly between the work piece facing surface 21 and the interior surface 32 of the bumper. Further optionally, each of these surfaces can include a recess 21R and 32R that capture a portion of the biasing element 50. As shown, the biasing element 50 can be in the form of a coil spring with ends disposed within the respective recesses 21R and 32R of the surfaces facing toward one another. In other applications, the biasing element 50 can be in the form of one or more leaf springs, an elastomeric bumper, opposing magnets, or other elements that can push the bumper 30 away from the base 20 automatically.

Figure 5:
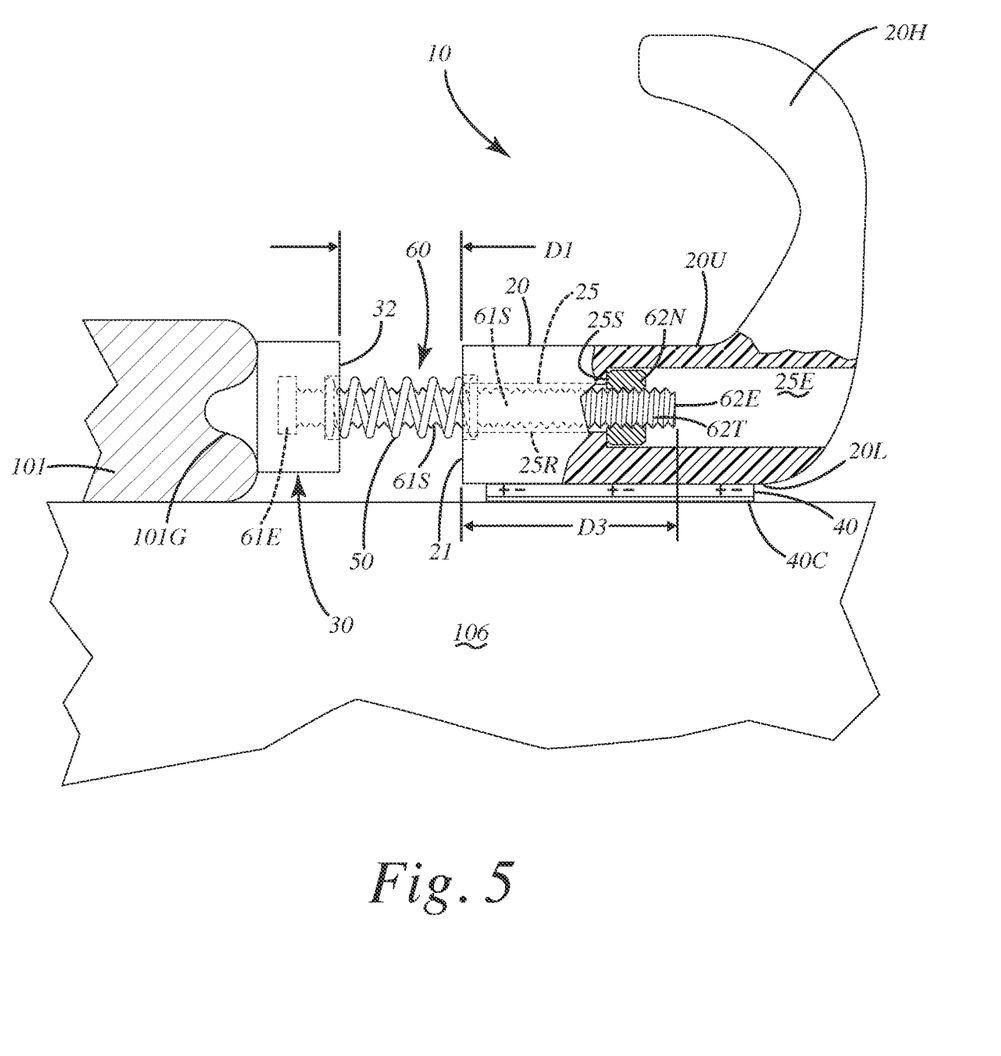
FIG. 5 is a side section view of the board pusher initially placed on the underlying joist.
Figure 6:
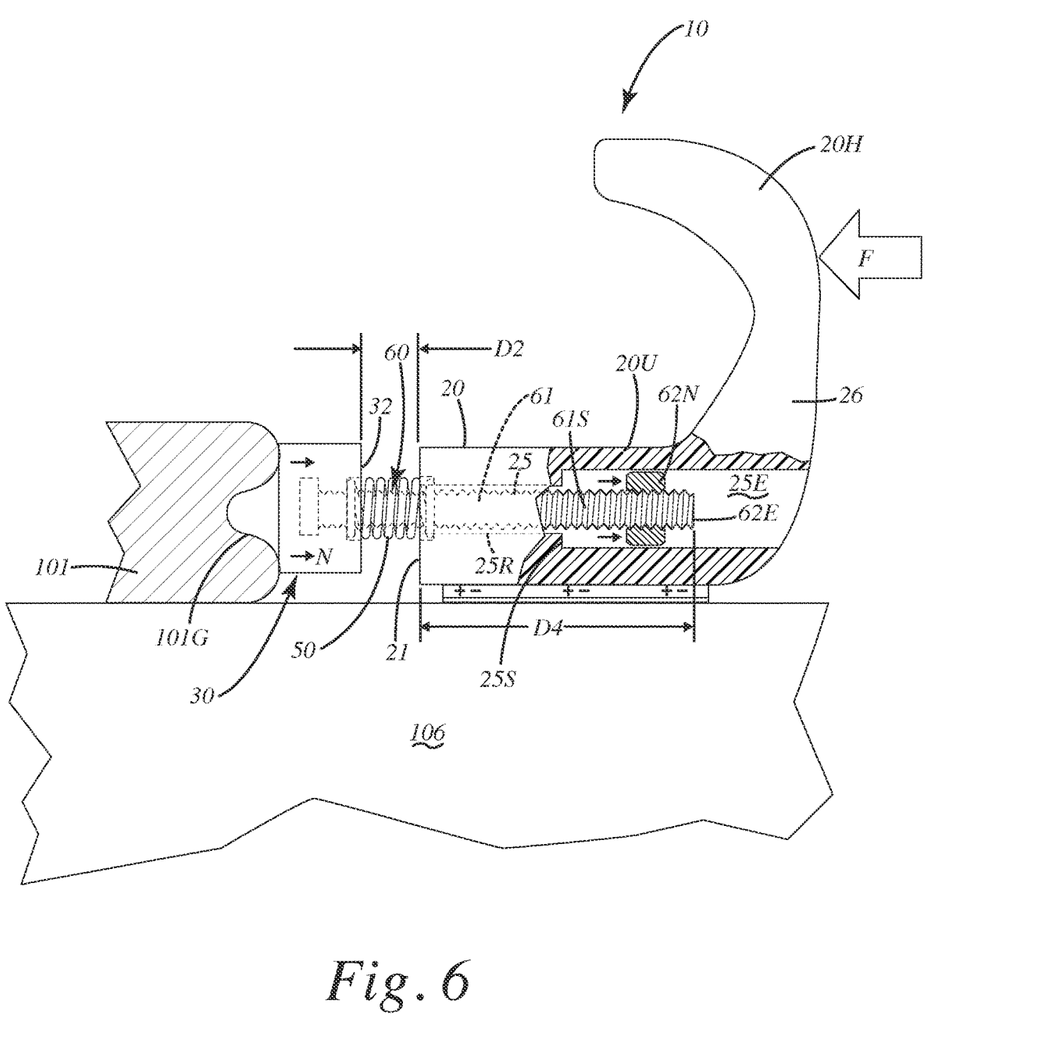
FIG. 6 is a side view of the board pusher placed on an underlying joist so that a bumper of the pusher engages and pushes a first board against a second board and/or a fastener clip.
Figure 7:
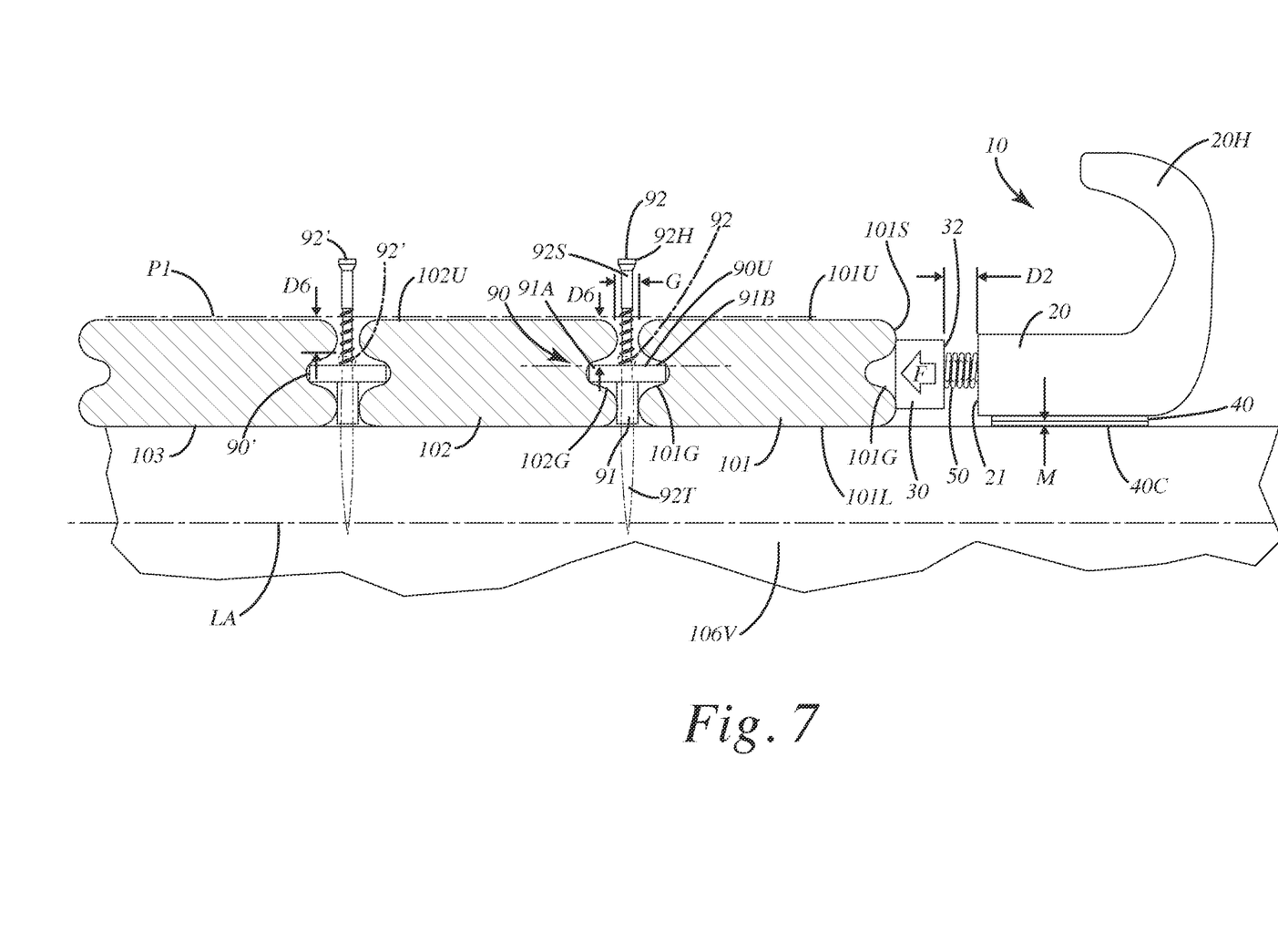
FIG. 7 is a side section view of the board pusher secured to the underlying joist in a fixed position via magnetic forces, while the pusher pushes the first board.

As shown in FIGS. 5 and 6, the pusher 10 optionally can include one or more guides 60 disposed between the bumper 30 and the base 20 to guide the bumper in its movement toward and/or away from the base under the forces generated by the biasing element 50. The guide 60 can be configured to allow the bumper to extend a predetermined distance D1 away from the base. This distance D1 can be the distance between the interior surface 32 and the work piece facing surface 21 when the bumper 30 is fully extended, and the pusher or bumper is in an extended mode, shown in FIG. 5. Optionally, this predetermined distance D1 can be the distance when the pusher 20 is disengaged from or otherwise not engaging a board or other element, with the coil spring extending the bumper away from the base. Generally, the guide 60 can guide the bumper relative to the base when the bumper is forcibly engaged against a board positioned on the joist before the board is fastened to the underlying joist. The guide 60 also can guide the bumper and its movement toward the base, such that the bumper moves smoothly toward and away from the base, without binding or twisting excessively. In particular, the guide 60 can guide the bumper 30 so that the bumper moves in direction N as shown in FIG. 6 toward the base 20 and a controlled and smooth manner. When this occurs, the predetermined distance D5 between the bumper and base shown in FIG. 5 decreases to a second distance D2 as shown in FIG. 7 and as described below.

As shown in FIGS. 1, 3 and 5, the guide 60 can include one or more bars that extend away from the work piece facing surface 21 and toward the bumper 30 and more particularly toward the interior surface 32 of the bumper 30. The guide 60 as shown, can include two bars, that is a first bar 61 and a second bar 62. Both of these bars are similar so only one will be described here. In particular, the first bar 61 can include a first end 61E fixedly joined with the bumper 30. In this construction, the first end 61E can include a head that can be molded, glued, secured or otherwise fastened to the bumper 30. The bar 61 can further include a shaft 61S that extends from the head to a second end 62E opposite the first and 61E. The second end 62E can slide relative to the base 20 as shown. The shaft 61S and/or the second end 62E can include threads 62T. A stop, optionally in the form of a nut, 62N can be secured to or threaded onto the threads of the second end 62E. Of course, another element or structure could be mounted to the second end 62E instead of the nut 62N. The base 20 can define a bar hole 25 that is configured to slidably or movably receive the bar 61. The bar hole 65 can include a shoulder 25S located between a reduced portion 25R and an enlarged portion 25E. The shaft 61S can slide or move within reduced portion 25R of the bar hole 25. The nut or a similar stop 62N at the second end 62E can move within the enlarged portion 25E of the bar hole 25. The stop 62N can engage the shoulder 25S of the bar hole 25 or the base in general to prevent the bumper 30, attached to the first and 61E from moving beyond the predetermined distance D1. Although shown as a movable shaft, the bar 61 can be in the form of other structures. For example, it can be an arm that extends off the bumper 30 and registers in a recess on a side of the base to limit the extension of the bumper 30 to the predetermined distance D1 when biased by the biasing element 50.

With further reference to FIGS. 1-3, the guide 60, for example, the first bar 61 can be configured to project a first distance D3 into the base 20 when the bumper 30 is extended to the predetermined distance D1 from the base. Optionally, this can be the minimum distance that the bar 61 extends into the base and/or generally past the work piece facing surface 21. This first distance D3 also can correspond to a configuration or mode of the pusher 20 when it is in an extended mode, with the bumper extended to the predetermined distance D1, and the bumper not yet engaging another object to compress or alter the biasing element. This condition in the fully extended mode of the pusher 10 is illustrated in FIGS. 1 and 5.

However, when the pusher is placed against a board, such that the bumper 30 moves toward or retracts toward the base 20 and/or work piece facing surface 21, the bumper moves the guide bar so that the bar 61 can extend a second distance D4 into the base. This second distance D4 can be greater than the first distance D3. This can occur when the bumper engages the board such that the biasing element 50 compresses generally between the work piece facing surface 21 and the interior surface 32 of the bumper 30, as the bumper moves in direction N as shown further in FIG. 6. In this construction, in transitioning from the extended mode shown in FIG. 5 to the retracted mode shown in FIG. 6, the bar 61 can move or slide within the bar hole 25 and in particular can move relative to the reduced portion 25R. The stop 62N also can optionally disengage the shoulder 25S and can project farther into the enlarged portion 25E of the bar hole 25. The end 62E of the guide 61 also can move away from the work piece engaging surface 21 toward the opposing surface 26 of the base 20. Generally, the guide 60 can move with the bumper 30 through a portion of the base 20, with the second end 62E moving toward the opposing surface 26 of the base 20 in transitioning from the extended mode shown in FIG. 5 to the retracted mode shown in FIG. 6.

Methods of using the board pusher 10 of the current embodiments to install a structure, such as boards relative to underlying joists, floor components relative to a substrate, panels relative to a surface and the like, will now briefly be described here. On a high level, in the context of an exemplary installation of the boards relative to underlying joists with reference to FIGS. 4 and 7, the method can include placing a first board 101 on an underlying joist 106 that comprises a magnetic material; placing a second board 102 on the underlying joist, adjacent the first board optionally in a parallel configuration with the first board 101; positioning a pusher 10, including a bumper 30 projecting away from the base 10 and biased therefrom via a biasing element 50, adjacent the first board 101 so that the bumper forcibly pushes the first board 101 toward the second board 102; and securing the pusher 10 adjacent the first board via a magnet 40 joined with a base 20 of the pusher, the magnet 40 exerting a magnetic force M on the magnetic material of the underlying joist 106 so that the pusher 10 is disposed in a fixed position relative to the underlying joist 106 while the bumper 30 forcibly pushes the first board 101 toward the second board 102.

More particularly, the pusher 10 can be used to install multiple boards 101, 102, 103 etc. relative to an underlying joist 106. The deck boards 101, 102, 103 can be placed transversely relative to the longitudinal axis LA of the joist 106 as shown in FIGS. 4 and 7. The boards optionally can be placed side-by-side one another, in some cases touching their side surfaces relative to one another with no gap formed therebetween. In other cases, such as that shown in FIGS. 4 and 7, the boards can be placed generally parallel to one another and perpendicular to one or more underlying joists 106. Each board can include a respective groove that faces a corresponding groove on an adjacent board. For example, the board 10a can include first and second grooves 101G on opposing side surfaces of the first board 101. These grooves can be disposed between an upper surface 101U and a lower surface 101L of the board. The lower surface 101L can face and/or contact the upper surface 106U of the underlying joist 106. The grooves can be of a U-, V- or channel shape and can be disposed between the upper and lower surfaces. As another example, the second board 102 adjacent the first board 101 can include a corresponding groove 102G. The grooves 101G and 102G can face toward one another and can be disposed between the respective upper and lower surfaces of the first and second boards.

In the embodiment shown in FIGS. 4 and 7, the method can include installing a clip 90 between the first board and the second board above the underlying joist 106. In particular, the clip 90 can be installed within the respective grooves 101G and 102G that face toward one another when the boards 101, 102 are adjacent to one another. The arms or wings 91A and 91B can be disposed in the respective grooves 102G and 101G. The spacer block 91 can engage the respective side surfaces above and/or below the arms 91A and 91B to establish a preselected gap G between the respective first and second boards 101 and 102.

As mentioned above and shown in FIGS. 4 and 7, the clip 90 can include a clip uppermost surface 90U. The first board 101 and the second board 102 each can include respective upper surfaces 101U and 102U. The clip uppermost surface 90U can be disposed a distance D6 below the first board upper surface 101U and the second board upper surface 102U, before the fastener 92 is installed and generally when the clip 90 is disposed between the boards. Optionally, the upper surfaces 101U and 102U can lay within and/or can be coextensive with a plane P1. This plane P1 can extend within or along and the upper surface of the deck comprising the various boards 101, 102, 103, etc. The clip and the clip uppermost surface 90U can lay the distance D6 below this plane P1, before, during and after installation of the clip 90 with the associated fastener 92.

With further reference to FIG. 7, the fastener 92 can be installed relative to the clip 90 and the underlying joist 106 to secure the first board 101 and second board 102, interacting the arms or wings 91A and 91B with the respective grooves 102G and 101G, thereby pulling the boards downward with a force against the upper surface 106U of the joist 106. The uninstalled fastener 92 is shown in solid lines in that figure while the installed fastener is shown in broken lines. As will be appreciated, where the underlying joist 106 is constructed from metal, the fastener can include a tip that can penetrate, mill into, or otherwise advance into a metal surface. When constructed from metal, the joist 106 can be a tubular construction, an I-beam construction or a C- or channel shaped construction. In this configuration, the tip 92T can penetrate the upper surface 106U and/or upper panel of the joist 106, and can extend into the void or internal space 106V of the joist 106 when fully installed.

Optionally, as the fastener 92 is advanced, the head 92H can begin from a position above the plane P1 and the upper surfaces 101U and 102U of the respective boards. As it continues to advance, the tip 92T advances into, through and/or past the spacer block 91 and eventually into or through the upper surface 106U of the joist 106. As the fastener advances, the head transitions below the first board upper surface 101U and the second board upper surface 102U, generally passing through and below the plane P1. The head 92H can continue to advance until the head 92H engages the clip upper surface 90U. When it does so, the head pulls or pushes the clip downward such that the arms or wings 91A and 91B engage respective grooves of the first and second boards to secure those boards against the upper surface 106U of the joist 106. When the head engages the clip upper surface, the head 92H can be disposed below the plane P1 and the upper surfaces 101U and 102U of the boards.

As described further below, the installation of the clip 90 and fastener 92, as well as all the other similar clips 90' and fasteners 92' installed between other boards, for example the boards 102 and 103, can occur while the bumper 30 of the pusher 90 forcibly pushes with a force F1 against the first board, and thus pushing that first board 101 toward the second board 102, optionally while the clips are disposed between the respective side surfaces of the boards.

As mentioned above, the pusher 10 can be used to exert a force against multiple boards to hold them in position adjacent one another and/or over a joist. With reference to FIGS. 4 and 7, this will be described in more detail in connection with the installation of those boards. As shown in FIG. 4, a first board 101 is positioned adjacent the second board 102. The second board also is positioned adjacent a third board 103, and optional fourth, fifth, sixth, seventh and other boards depending on the size of the structure being built. The first clip 90 with its fastener 92 is placed between the first board 101 and the second board 102. A second clip 90' with its fastener 92' is placed between the second board 102 and the third board 103. In these initial steps of placement of the clips and fasteners, the first fastener in the second fastener can extend through the respective first and second clips at least partially, but not into the underlying joist 106. Indeed, the tips of the fasteners can remain above and/or adjacent the upper surface 106U of the joist 106 in this initial step of positioning the boards and clips in fasteners relative to the underlying joist. In this initial configuration, all of the first board, second board, third board etc. optionally can be free-floating and unsecured relative to the underlying joist before any securing of the first board, second board, third board, etc. fixedly to that underlying joist 106.

In some cases, as shown in FIG. 4, the first board 101 initially can be disposed a distance D5 away from the second board 102, with the clip 90 placed between the respective grooves 101G and 102G of the boards. This distance D5, however may be too significant of a gap, greater than the desired gap G between the boards is shown in FIG. 7. Accordingly, a user U can grasp the handle and move the pusher 10 toward and adjacent the first board 101. The user optionally can allow the magnet 40 to exert a magnetic force M on the underlying joist 106. The user can push the base 20 along the upper surface 106U of the joist 106. The cover 40C can prevent the magnet 40 from scratching the upper surface 106U as this is done. The bumper 30 can engage the side surface 101S of the first board 101, optionally adjacent and/or over the groove 101G along that side 101S.

The user U can continue to exert a force F1 against the pusher which is translated to the bumper 30 and thus to the board 101. The board can move in direction L as the bumper pushes it. As this occurs, the board can further engage the clip, for example, the spacer block, with the arm 91B further entering the groove 101G of the first board 101. The user can continue to push the pusher, and in so doing, the spring 50 between the bumper and the base 20 can compress and store energy. The user can place additional identical pushers along other joists parallel to the joist 106 in a similar fashion to push the first board 101 toward the second board 102 and optionally capture the clip 90 there between. Simultaneously, the second board 102 can push against the third board 103 and so on, amongst other boards.

After the pusher is adequately placed, the user can ensure the magnetic force M is exerted between the pusher 10 and the underlying joist 106 as shown in FIG. 7. There, the force F1 continues to be exerted on the first board 101 via the bumper 30 engaging the side surface 101S of the first board. Likewise, the force F1 translates through to the other boards 102, 103, etc. to hold the respective boards adjacent one another and/or adjacent the respective clips disposed between the boards. The pusher, thus with the magnetic force M holding that pusher in a fixed position, continues to exert force F1 and forcibly push against the first board 101 against the second board and so on. In some cases, the first board, second board and third board can slide simultaneously together along the underlying joist 106 with or under the force F1 of the pusher, and/or the force exerted by the user when initially placing the pusher 10 relative to the boards. The user can rely on the pusher to maintain this force F1 while the user installs the fasteners 92 relative to the respective clips 90 and/or in other applications installs other fasteners through the upper surfaces 101U, 102U etc. of the respective boards.

The installation of the fasteners can continue while the pusher exerts the force F1 against the first board, second board third board etc. After the installation of the fasteners and clips relative to the boards, the first, second, third etc. boards are fixedly secured to the underlying joist 106. The pusher can be removed from the joist and the bumper disengaged from the first board after securement of the boards.

It will be appreciated that by identifying or naming herein certain elements as first, second, third, etc., that does not require that there always be a certain number of elements preceding, succeeding, above, below, adjacent and/or near the numbered elements. Further, any one of a numbered group of elements, for example, a third element, alternatively can be referred to as a first, second, fourth or other numbered row element. The same is true for the naming of any other elements in the form of a first element, second element, third element, etc. as used herein.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of installing a structure, the method comprising:
   placing a first board on an underlying joist that comprises a magnetic material;
   placing a second board on the underlying joist, adjacent the first board in a parallel configuration with the first board;
   positioning a pusher, including a bumper projecting away from a base and biased therefrom via a biasing element, adjacent the first board so that the bumper forcibly engages the first board with a force of at least 2 pounds to push the first board toward the second board;
   securing the pusher adjacent the first board via a magnet joined with the base of the pusher, the magnet exerting a magnetic force on the magnetic material of the underlying joist so that the pusher is disposed in a fixed position relative to the underlying joist;
   securing the first board and the second board fixedly to the underlying joist while the pusher pushes the first board toward the second board;
   positioning a third board adjacent the second board and on the underlying joist;
   positioning a first clip between the first board and the second board with a first fastener extending through the first clip but not into the underlying joist; and
   positioning a second clip between the second board and the third board with a second fastener extending through the second clip but not into the underlying joist,
   wherein the pusher pushes the first board toward the second board, and simultaneously pushes the second board toward the third board, all while the first board, the second board and the third board are free floating and unsecured relative to the underlying joist before said securing the first board and the second board fixedly to the underlying joist.

2. The method of claim 1 comprising:
   advancing the first fastener to secure the first board and the second board to the underlying joist; and
   advancing the second fastener to secure the first board and the second board to the underlying joist.

3. A method of installing a structure, the method comprising:
placing a first board on an underlying joist that comprises a magnetic material;
placing a second board on the underlying joist, adjacent the first board in a parallel configuration with the first board;
positioning a pusher, including a bumper projecting away from a base and biased therefrom via a biasing element, adjacent the first board so that the bumper forcibly pushes the first board toward the second board;
securing the pusher adjacent the first board via a magnet joined with the base of the pusher, the magnet exerting a magnetic force on the magnetic material of the underlying joist so that the pusher is disposed in a fixed position relative to the underlying joist while the bumper forcibly pushes the first board toward the second board;
positioning a third board adjacent the second board and on the underlying joist; and
positioning a fourth board adjacent the third board and on the underlying joist;
wherein the pusher pushes the first board toward the second board, and simultaneously pushes the second board toward the third board, all while the first board, the second board and the third board are free floating and unsecured relative to the underlying joist.

4. The method of claim 3 comprising:
installing a clip between the first board and the second board above the underlying joist;
installing a fastener through the clip after the securing the pusher adjacent the first board.

5. The method of claim 4 comprising:
inserting the clip into a first groove of the first board and a second groove of the second board,
wherein the clip includes a clip uppermost surface,
wherein the first board includes a first board upper surface above the first groove,
wherein the second board includes a second board upper surface above the second groove,
wherein the clip uppermost surface is disposed below the first board upper surface and the second board upper surface.

6. The method of claim 5 comprising:
advancing the fastener so that a head of the fastener, disposed above the first board upper surface and the second board upper surface transitions below the first board upper surface and the second board upper surface until the head engages the clip uppermost surface.

7. The method of claim 3 comprising:
advancing a fastener to secure at least one of the first board and the second board to the underlying joist,
wherein the fastener includes a head and a shaft,
wherein during the advancing of the fastener, the head passes through a plane coextensive with a first board upper surface of the first board and a second board upper surface of the second board.

8. The method of claim 7 comprising:
registering a clip with the first board and the second board while the bumper forcibly engages the first board; and
wherein the fastener shaft advances through the clip during the advancing.

9. The method of claim 3 comprising:
securing the first board and the second board fixedly to the underlying joist while the pusher pushes the first board toward the second board.

10. The method of claim 9,
wherein the biasing element is disposed between the base and the bumper,
wherein the biasing element urges the bumper away from the base, while the base is magnetically secured to the underlying joist.

11. The method of claim 3 comprising:
sliding the first board, the second board and the third board together simultaneously along the underlying joist with the pusher.

12. The method of claim 11 comprising:
fastening the first board, the second board and the third board to the underlying joist with respective clips and fasteners while the pusher pushes the first board toward the second board toward the third board.

13. The method of claim 3 comprising:
guiding the bumper relative to the base with a guide as the bumper pushes the first board toward the second board,
wherein the biasing element pushes the bumper away from the base while the guide restrains the bumper from extending beyond a predetermined distance away from the base.

14. The method of claim 3 comprising:
wherein the underlying joist is at least one of a tubular construction, an I-beam construction, a C-shaped construction, and a channel shaped construction,
wherein the securing the first board and the second board comprises advancing a fastener having a tip such that the tip penetrates the underlying joist and extends into the at least one of a void and an internal space of the underlying joist when the fastener is fully installed relative to the underlying joist.

* * * * *